(12) United States Patent
Sadrmajles et al.

(10) Patent No.: US 8,607,907 B2
(45) Date of Patent: Dec. 17, 2013

(54) DRIVE SYSTEM FOR ELECTRIC VEHICLES

(75) Inventors: Habib Sadrmajles, Richmond Hill (CA); Saeid Mohmedi, Richmond Hill (CA)

(73) Assignee: M.I.S. Electronics Inc., Richmond Hill, Ontario ( * ) Notice: Subject to any disclaimer, the term of this patent is extended or adjusted under 35 U.S.C. 154(b) by 465 days.

(21) Appl. No.: 13/020,707

(22) Filed: Feb. 3, 2011

(65) Prior Publication Data

US 2011/0198138 A1    Aug. 18, 2011

Related U.S. Application Data

(60) Provisional application No. 61/301,078, filed on Feb. 3, 2010.

(51) Int. Cl.
*B60K 1/00*    (2006.01)

(52) U.S. Cl.
USPC ........................................................ 180/65.51

(58) Field of Classification Search
USPC ........................................................ 180/65.51
See application file for complete search history.

(56) References Cited

U.S. PATENT DOCUMENTS

2010/0108417 A1*    5/2010    Gilmore ................ 180/65.51

* cited by examiner

*Primary Examiner* — Jeffrey J Restifo
*Assistant Examiner* — Erez Gurari
(74) *Attorney, Agent, or Firm* — McMillan LLP

(57) ABSTRACT

A drive system for an electric battery powered vehicle including a chassis having a rigid frame, a front axle and a rear axle; a battery system mounted on said chassis; left and right wheels on left and right sides of each of the front axle and the rear axle; one or more motors attached to at least one of the wheels. Each of the one or more motors is driven by rotation of a respective wheel to produce a charge for said battery system.

13 Claims, 5 Drawing Sheets

DRIVE SYSTEM FOR ELECTRIC VEHICLES

This application claims priority from U.S. Provisional Patent Application Ser. No. 61/301,078 filed on Feb. 3, 2010, the contents of which are incorporated herein by reference.

FIELD OF THE INVENTION

The present invention relates generally to vehicle drive systems, and more particularly, to a drive system for electric vehicles.

BACKGROUND OF THE INVENTION

A significant amount of research and development has been undertaken to develop electrical and hybrid vehicles as an alternative to traditional gas powered combustion engine vehicles. The primary roadblock in implementing electric battery power on a large scale has been the limited amount of energy that can be stored in a battery system of reasonable size and weight that can be carried on a vehicle, in combination with the lack of a suitable charging system for the size and weight of a battery system that can be carried on a vehicle. Thus, the range of electric battery powered vehicles is limited to the range of travel possible between charges, and that range to date has been particularly limited. There is therefore a need in the art for an electric battery powered vehicle with an increased driving range between charges.

Another problem with electric vehicles is the problem of recharging the battery system. Charging stations are expensive to install and even when installed, they consume energy derived from other traditional sources. Thus, the electrical demands on public power systems can potentially be significantly increased. Thus to realize the full potential of electric battery powered vehicles, there is a need in the art for such vehicles that require fewer charges, and further to provide for more efficient charging systems that can interact with the battery systems on these vehicles.

Various solutions have been provided in the prior art relating to the materials used and optimizations of size, and arrangements of the battery system in other ways, but there remains a need in the art for an improved drive system, charge system and battery system for electric vehicles that will improve upon one or more of the above-identified problems with the prior art.

It is therefore an object of the invention to provide a novel drive system for use with electric battery powered vehicles.

SUMMARY OF THE INVENTION

According to one embodiment of the invention, there is provided a drive system for an electric battery powered vehicle including a chassis having a rigid frame, a front axle and a rear axle; a battery system mounted on said chassis; left and right wheels on left and right sides of each of the front axle and the rear axle, and one or more motors attached to at least one of said wheels. Each of the one or more motors is driven by rotation of a respective wheel to produce a charge for the battery system. Optionally, one or more reduction gears are provided between each of the wheels and a respective motor.

According to one aspect of the invention, the battery system provides supplemental driving power to the vehicle only.

According to another aspect of the invention, the drive system further includes an acceleration system including a moveable magnet element, and a stationary magnet element mounted to said drive system, The moveable magnet element is moveable with respect to the vehicle, and thereby provides a repelling force to the vehicle to drive the vehicle.

According to another aspect of the invention, the moveable magnet element is mounted on a carriage secured to the rear of the vehicle. The carriage preferably includes means for providing reciprocating motion to the moveable magnet element.

According to another aspect of the invention, the moveable magnet element is mounted on a moving means secured to a mid-portion of the chassis.

According to another embodiment, the moving means comprises a driving motor and winch system, wherein the driving motor and winch system moves the moveable magnet element in a reciprocating motion with respect to the stationary magnet element.

According to an aspect of this embodiment, the driving motor is powered by the battery system. Optionally, the driving motor comprises a DC motor.

According to another aspect of the invention, the one or more motors comprise hub motors. Preferably, each of the hub motors is used to generate electricity as each of the wheels rotates. The generated electricity is preferably used to charge the battery system.

According to another embodiment of the invention, the means for providing reciprocating movement to the moveable magnet element is a reciprocating screw. According to an aspect of this embodiment, there is provided a driving motor for activating the reciprocating screw. Preferably, the driving motor is powered by the battery system.

According to another aspect of the invention, the magnets are rare earth Neodymium magnets.

BRIEF DESCRIPTION OF THE DRAWINGS

Embodiments will now be described, by way of example only, with reference to the attached Figures, wherein.

DETAILED DESCRIPTION OF THE EMBODIMENTS

Figure 1:
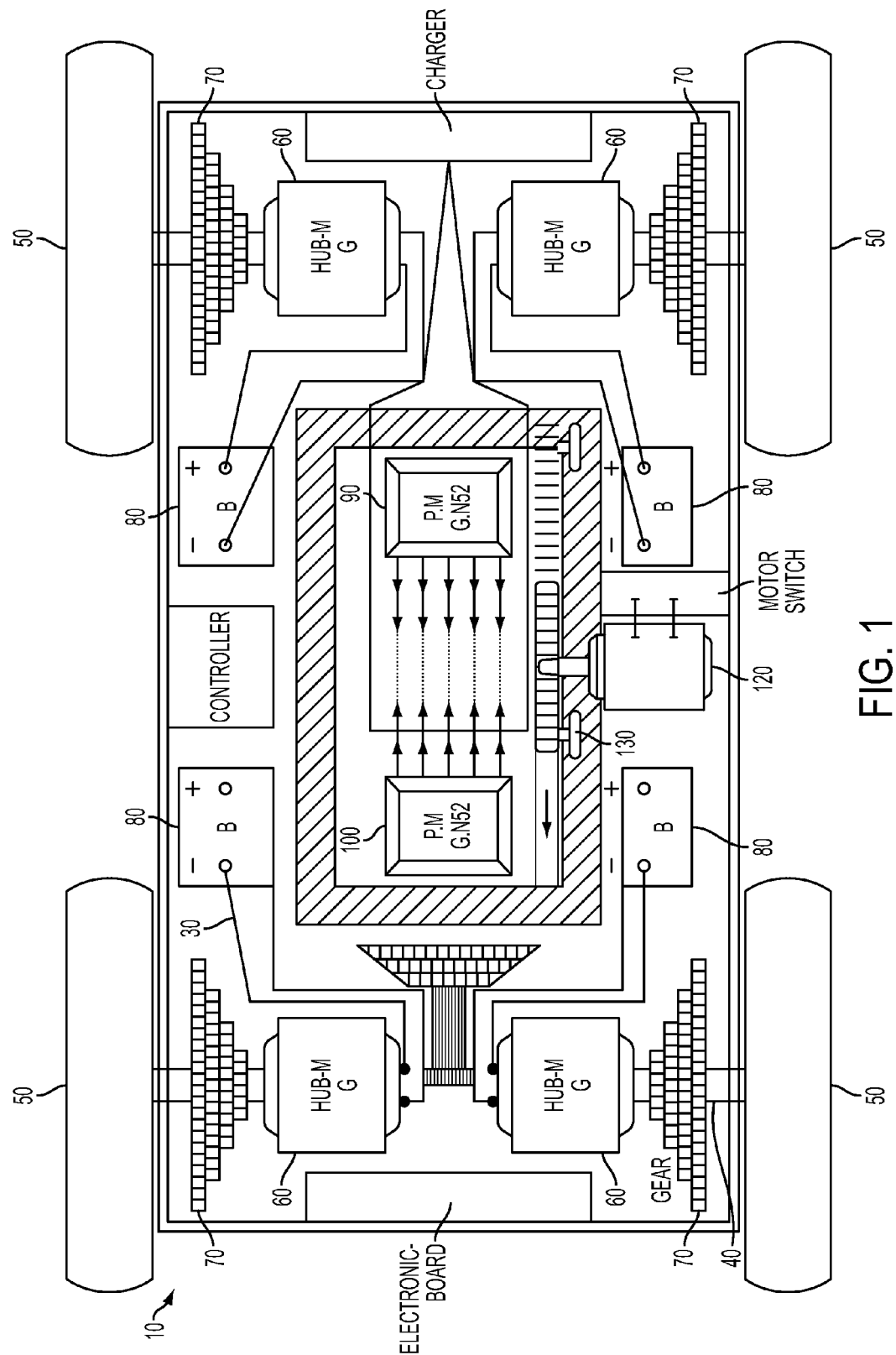
FIG. 1 shows a schematic view of one embodiment of the invention.
Figure 2:
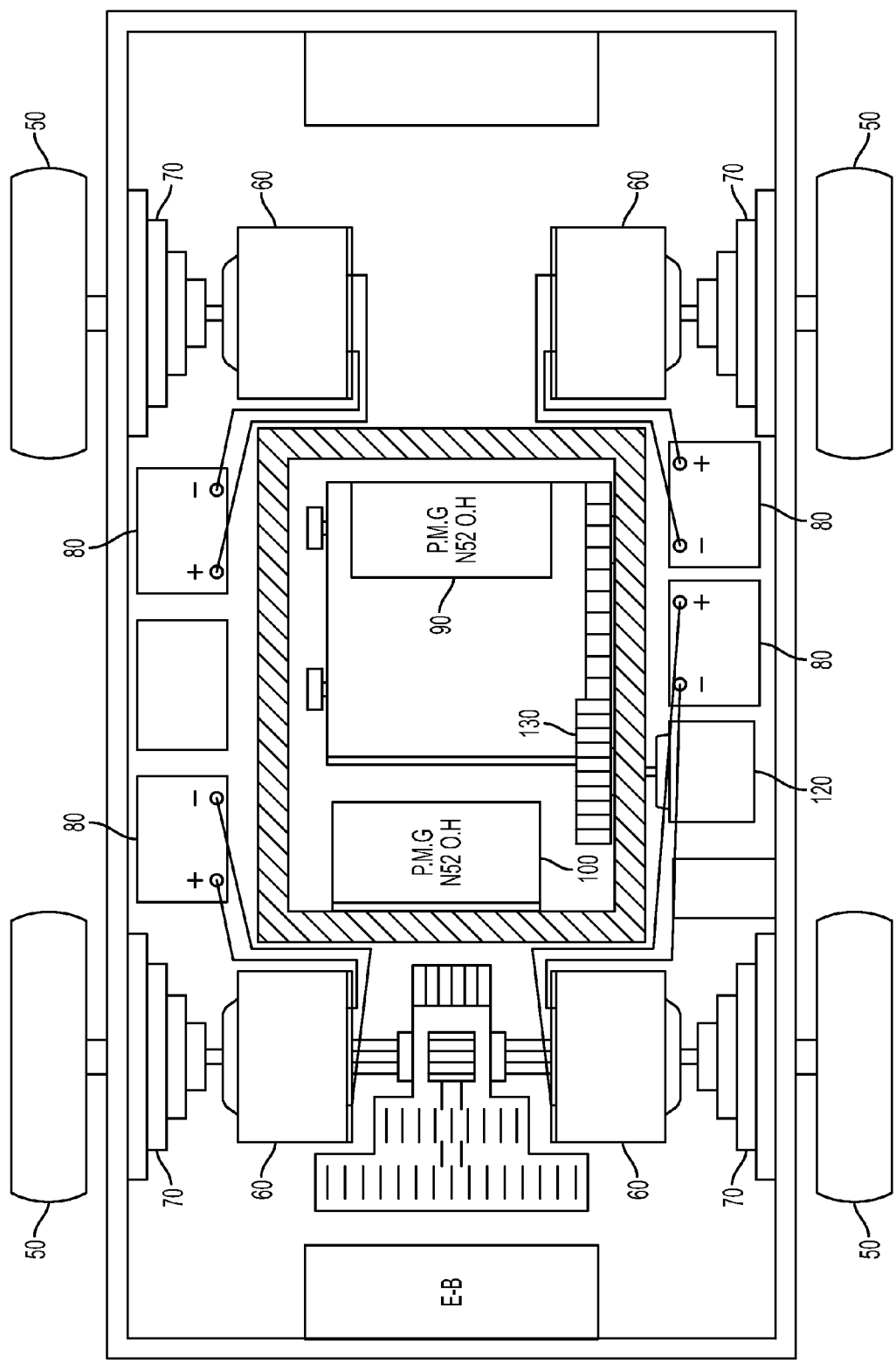
FIG. 2 shows a schematic view of a variation of the invention of FIG. 1.
Figure 5:
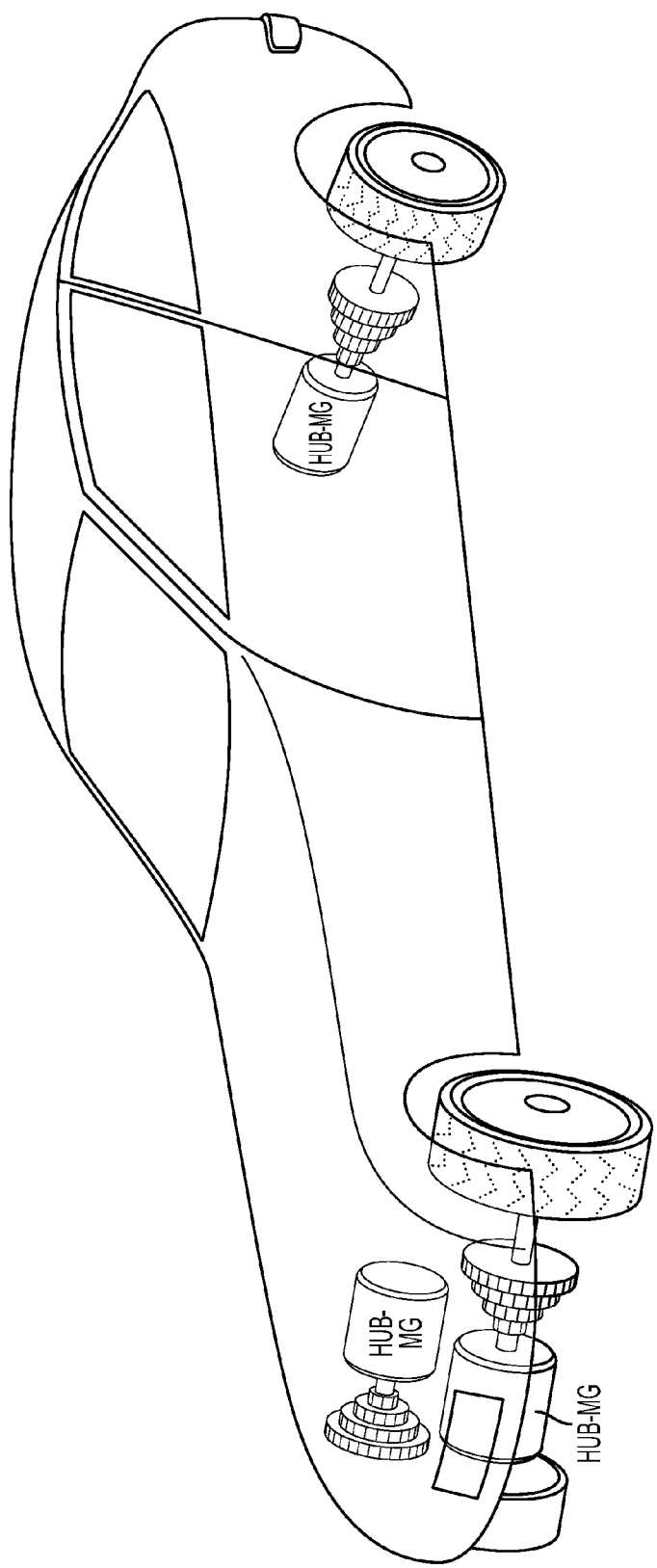
FIG. 5 shows a vehicle using the invention of FIG. 1.

The invention includes an improved drive system for a vehicle, shown in FIG. 5, that may be used in an electric battery powered vehicle, or may alternatively be adapted for use in hybrid vehicle. Referring now to FIGS. 1 and 2, there is shown a vehicle 10 having a drive system 20 that includes a chassis 30, drive axles 40 and wheels 50 attached thereto, as are typically found on all modern day vehicle drive systems. The chassis 30 preferably includes a rigid frame, and the drive axles 40 comprise front and rear axels. The rigid chassis frame is preferably manufactured from a lightweight material of sufficient strength to meet vehicle design requirements. Mounted on the chassis is a battery system 80, formed from one or more, and preferably a plurality of rechargeable battery packs. One or more motors 60 are attached to at least one of the wheels 50. In the preferred embodiment, there is one motor 60 attached each wheel 50. The motors 60 are driven by rotation of the wheels 50 when the vehicle is in motion. The driven motor generates power that is used to charge the battery system 80. The charging of rechargeable batteries from a source is known in the art and thus not described further herein.

The drive system 20 preferably further includes an acceleration system to generate motive power for the vehicle. Thus, there is provided a moveable magnet element 90 and a stationary magnet element 100. The stationary magnet element 100 is preferably mounted to the drive system, for example, mounted to the chassis 30. The moveable magnet element 90 is moveable with respect to the vehicle, and thereby, in operation, provides a repelling force to the vehicle to drive the vehicle. Additional stationary magnet elements may be provided. Optionally, the battery system 80 provides supplemental driving power to the vehicle, or provides start-up power to activate the elements that cause movement to the moveable magnet element 90 as will be described in more detail below.

In the embodiment illustrated in FIG. 1, the moveable magnet element 90 is mounted on a moving means proximate a mid-portion of the chassis, and in close proximity to the stationary magnet element 100. The moving means preferably comprises a driving motor 120 and winch 130 system. The mechanics of a motor-winch system are well known and are therefore not described in further detail. Rather, the application of such a system to drive a motor on a vehicle as described herein provides advantages and benefits over prior art drive systems. In operation, the driving motor 130 is powered by the battery system 80, thereby operating the winch 130 to create the reciprocating motion of the moveable magnet element 90. As the moveable magnet element 90 reciprocates; it creates a repelling force upon approach with the stationary magnet 100, and thereby drives the vehicle forward. The battery system 80 is considered to provide sufficient power to the driving motor 120 to create the motion in the vehicle.

In one example, the vehicle will use the power of the 12 volt DC motor and winch system to bring the two magnets of the same poles closer, that is the moveable magnet will be brought closer to the magnet fixed proximate the front end of the vehicle. This will apply a force into the chassis of the vehicle. Then the force will transfer through the gear box to the wheels and rotate the wheels without using a powerful motor to accelerate the wheels. With this technique, the energy between the two magnets is generated when they are repelled by each other as a pushing force into the chassis of the vehicle to cause the wheels to rotate. A hub motor may be functionally attached to each wheel and can be used to generate electricity as the wheels rotate. Each wheel will be able to generate electricity that can be stored in a number of battery packs on board the vehicle. To operate a 4000 lb vehicle, the present invention contemplates the use of a 12 volt DC, 1 horsepower winch system to place the moveable magnet against the stationary magnet fastened to the vehicle chassis. Any power generated from the hub motors will be saved in the onboard batteries. The size of the winch motor required to move the moveable magnet depends upon the size and weight of the vehicle. For example, with the weight of a 4000 pound vehicle the following is needed, a 12 Volt DC motor, 60 amps electric winch motor (1 hp electric motor), a lower RPM, three blocks of rare earth Neodymium at ten pounds per block with a total of 30 lbs of weight for the magnets. It is then possible to generate on each wheel, 48 V and 100 Amps Electricity. Thus, 19200 W may be generated, with additional energy being supplied by the Rare Earth magnets natural repulsion.

Figure 3:
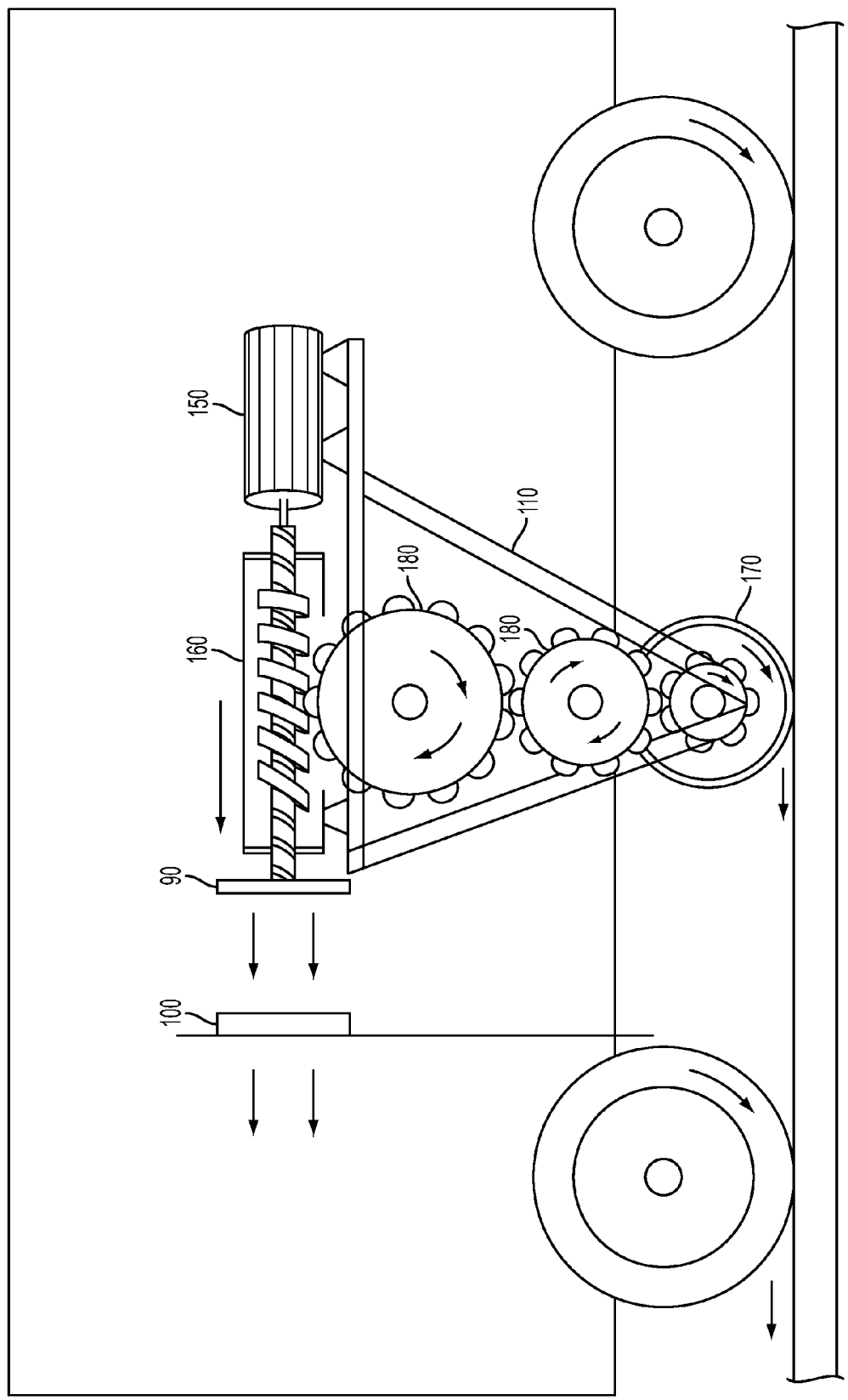
FIG. 3 shows a carriage assembly according to one aspect of the invention.
Figure 4:
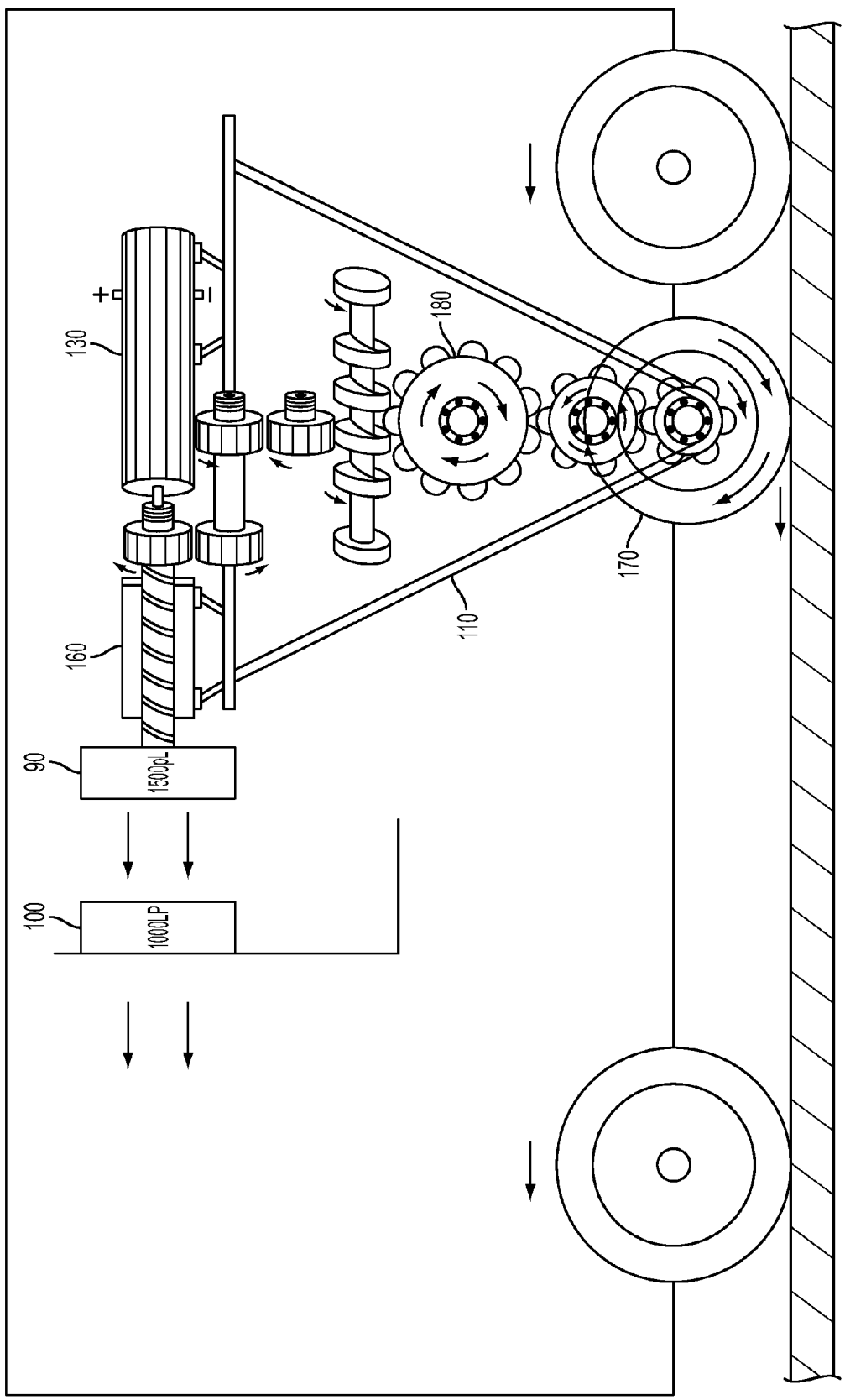
FIG. 4 shows a carriage assembly according to another aspect of the invention.

According to another embodiment, as shown in FIGS. 3 and 4, the moveable magnet element 90 is mounted proximate a rear portion of the vehicle on a carriage 110. The carriage includes means for providing reciprocating motion to the moveable magnet element 90. In the embodiment illustrated in FIG. 3, the means for providing reciprocating motion is a driving motor 150 and reciprocating screw 160 system. In this embodiment, the carriage 110 includes a carriage wheel 170 on which the carriage 110 maintains it's movement with respect to the vehicle. Aboard the carriage 110, the reciprocating screw 160, driven by driving motor 150 moves the moveable magnet element 90 back and forth with respect to the stationary magnet element 100, thereby creating the repelling force between the magnets that drives the vehicle. On the retraction stroke of the reciprocating screw 160, when the moveable magnet element 100 is moving away from the stationary magnet element 100, the reciprocating screw 160 engages gears 180 to cause rotation in the wheel 170 and thus causes carriage 110 to move forwards.

In both embodiments, the driving motor 120 is preferably driven the battery system 80. In an alternative embodiment, additional power sources from the vehicle, including but not limited to, gas, solar and other electric power sources may be used to drive the driving motor 120. As the wheels 50 rotate in operation, gears 70, attached to hub motors 60, produce an optimized reduction such that the hub motors 60 may be rotated at a sufficient rate to generate electricity that may be used to charge the battery system 80. In this manner, as the vehicle is driven, the battery system 80 is charged, thereby minimizing any external power requirements to run the driving motor 120.

Preferably the magnets used are rare-earth magnets such as Neodymium Grade N52, Neodymium (Nd2 Fe14 B), and a Neodymium, iron and boron combination magnet. The preferred magnet is a Neodymium Grade 52 permanent magnet. In operation, if the positive or negative poles of two Rare Earth Neodymium Grade 52 permanent magnets are brought together as shown in FIG. 1, with a closed circuit there is a strong energy field between the two poles of the aforementioned magnet. By controlling and harnessing this energy, it is desired to transfer the energy into a pushing force effect for producing backward or backward movement of the wheels of a vehicle as shown in FIG. 2. It is anticipated that this effect can be produced regardless of the size or weight of the vehicle and can provide a more environmentally friendly energy source for driving vehicles.

Various alternatives may be employed other than those shown in the illustrated embodiments. For example, other mechanisms for creating reciprocating movement other than the winch-motor and reciprocating screw-motor mechanisms as have been described. The invention contemplates the use of any mechanism able to generate the reciprocating motion between the stationary magnet element and the moveable magnet element to create a pushing force on the vehicle to thereby drive the vehicle.

The above-described embodiments are intended to be examples of the present invention and alterations and modifications may be effected thereto, by those of skill in the art, without departing from the scope of the invention that is defined solely by the claims appended hereto.

What is claimed is:
1. A drive system for a vehicle comprising:
a chassis having a rigid frame, a front axle and a rear axle;
a battery system mounted on said chassis;
left and right wheels on left and right sides of each of the front axle and the rear axle; one or more motors attached to at least one of said wheels;

wherein each of said one or more motors is driven by rotation of a respective wheel to produce a charge for said battery system;

an acceleration system including:

a moveable magnet element; and, a stationary magnet element mounted to said drive system;

wherein said moveable magnet element is moveable with respect to said stationary magnet element, and, wherein said moveable magnet element is mounted on a carriage secured to the rear of the vehicle; said carriage comprising means for providing reciprocating motion to said moveable magnet element.

2. A drive system according to claim 1, wherein said moveable magnet element is mounted on a moving means secured to a mid-portion of said chassis.

3. A drive system according to claim 1, wherein one or more reduction gears are provided between each of said wheels and each said motor.

4. A drive system according to claim 2, wherein said moving means comprises a driving motor and winch system, wherein said magnet driving motor and winch system moves said moveable magnet element in a reciprocating motion with respect to said stationary magnet element.

5. A drive system according to claim 4, wherein said driving motor is powered by said battery system.

6. A drive system according to claim 5, wherein said driving motor comprises a DC motor.

7. A drive system according to claim 1, wherein said one or more motors comprise hub motors.

8. A drive system according to claim 7, wherein each of said hub motors is used to generate electricity as each of said wheels rotate.

9. A drive system according to claim 8, wherein said generated electricity is used to charge said battery system.

10. A drive system according to claim 1, wherein said means for providing reciprocating movement to said moveable magnet element comprises a reciprocating screw.

11. A drive system according to claim 10, further comprising a driving motor for activating said reciprocating screw.

12. A drive system according to claim 11, wherein said driving motor is powered by said battery system.

13. A drive system according to claim 1, wherein said magnets comprise rare earth Neodymium magnets.

\* \* \* \* \*